Figure 1:
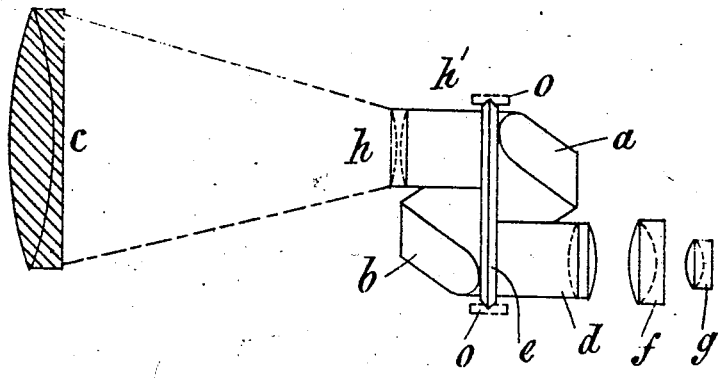

No. 765,607. PATENTED JULY 19, 1904.
J. AITCHISON.
PRISMATIC TELESCOPE, BINOCULAR, OR THE LIKE.
APPLICATION FILED MAR. 2, 1903.
NO MODEL. 2 SHEETS—SHEET 1.

Witnesses:
Inventor
James Aitchison

No. 765,607. PATENTED JULY 19, 1904.
J. AITCHISON.
PRISMATIC TELESCOPE, BINOCULAR, OR THE LIKE.
APPLICATION FILED MAR. 2, 1903.
NO MODEL. 2 SHEETS—SHEET 2.

Witnesses:
James L. Norris Jr.
C. D. Kesler.

Inventor
James Aitchison
By James L. Norris
Atty.

No. 765,607.

UNITED STATES PATENT OFFICE.

JAMES AITCHISON, OF LONDON, ENGLAND.

PRISMATIC TELESCOPE, BINOCULAR, OR THE LIKE.

SPECIFICATION forming part of Letters Patent No. 765,607, dated July 19, 1904.

Application filed March 2, 1903. Serial No. 145,828. (No model.)

*To all whom it may concern:*

Be it known that I, JAMES AITCHISON, a subject of the King of Great Britain, residing at 14 Newgate street, in the city of London, England, have invented certain new and useful Improvements in Prismatic Telescopes, Binoculars, or the Like, of which the following is a specification.

My invention relates to prismatic telescopes, field-glasses, and binoculars and to any instrument in which erection of the image is secured by totally-reflecting prisms, as in the Porro telescopes, or otherwise. In such instruments as hitherto made the light from the converging object-glass usually passes through two totally-reflecting prisms of the usual form, a certain interval being in most cases allowed between the prisms with the object of allowing the focal length of the object-glass to be made considerably greater than the length of the telescope-body. Glasses so constructed have an advantage over the Galilean or ordinary field-glass in that they can have a much greater field of view, since the eye-point is beyond the eyepiece. Hitherto, however, prismatic glasses have been markedly inferior to Galilean glasses in illumination, owing to the small relative aperture of the former. In order to secure the maximum illumination from any telescope, it is necessary that the diameter of the object-glass should bear the same ratio to the effective maximum diameter of the pupil of the eye as the magnification required. For example, if we take the maximum apparent diameter of the pupil as five millimeters and a magnification of twelve diameters is required the diameter of the object-glass should be sixty millimeters. In prismatic binocular glasses of this magnification as ordinarily made the diameter of the object-glass is not more than twenty-five millimeters, or five-twelfths of the above, giving an illumination of only twenty-five one-hundred-and-forty-fourths, or about .174 of the full amount. With prisms of ordinary size and glass it is useless to increase the diameter of the object-glass beyond this, as the extra light would be cut off by the prisms.

According to my invention I obtain greater diameter of object-glass, and hence of illumination, by the following devices.

Reference is hereby made to the accompanying drawings, in which similar letters indicate corresponding parts.

Figure 2:
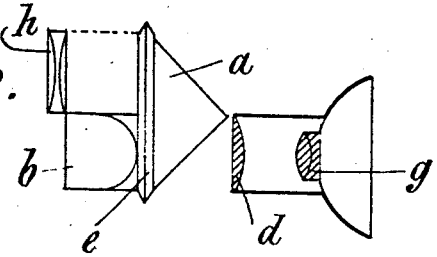
Figure 3:
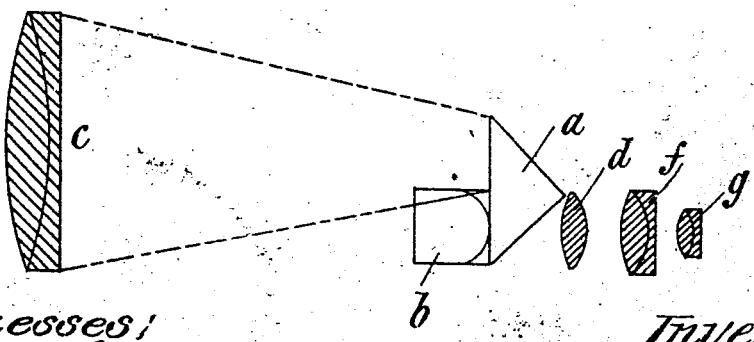
Figure 4:
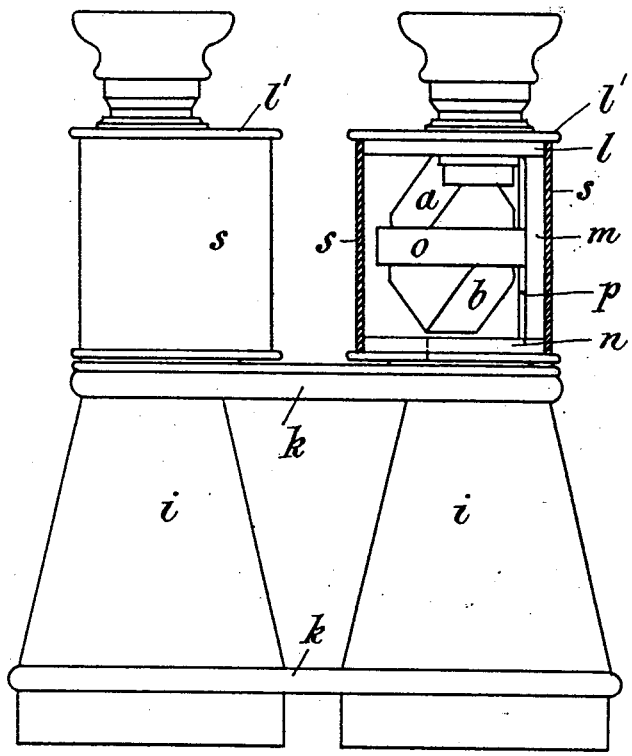
Figure 5:
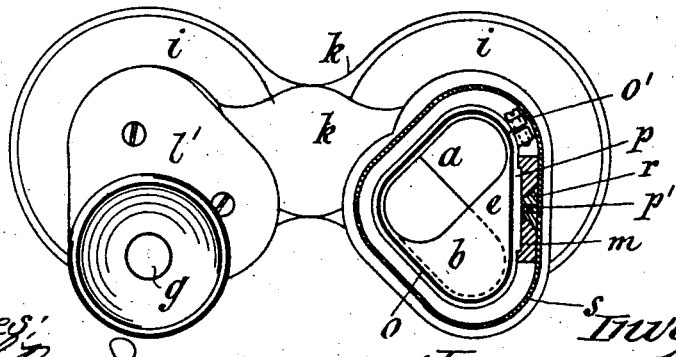

Figure 1 shows the optical arrangements of my prism glass without the mountings and case. Fig. 2 is a diagrammatical sketch of a modification. Fig. 3 is a similar sketch of a further modification. Fig. 4 is a sectional elevation of a prismatic binocular constructed according to my invention, and Fig. 5 is a sectional plan of Fig. 4.

First. The prisms $a\,b$ are brought close together, as shown, which greatly increases the angle between the extreme rays which can pass into the prism. These rays, however, will not be totally reflected and received by the eyepiece unless they meet the reflecting-surface at an angle greater than the critical angle of the glass of the prisms. For ordinary boro-silicate crown-glass, which is usually employed for prisms and which has a refractive index of 1.5093, we have: Sin. critical angle equals $\frac{1}{1.5093} = .673$, from which the critical angle is forty-one degrees thirty minutes approximately. Since the optic axis meets the surface at an angle of forty-five degrees, it follows that the semi-angle of the cone of light formed by the object-glass in the glass cannot be greater than forty-five degrees minus forty-one degrees thirty minutes equals three degrees thirty minutes or five degrees fifteen minutes in air in order to be totally reflected, which angle is insufficient for apertures in which the diameter of the object-glass is greater than two multiplied by focal length multiplied by tan. five degrees fifteen minutes, or about .18 of the focal length. In order, therefore, to have a glass with a magnifying power of twelve diameters, and consequently with an object-glass of sixty millimeters diameter, the focal length would have to be $\frac{60}{.18}$ equals 333 millimeters, which would be inconveniently great for a field-glass.

Second. In order to obtain total reflection of rays from a large objective such as $c$ without lengthening the instrument, I employ glass for the prisms having a high refractive index, and consequently a low critical angle. By this means the following advantages are secured: (a) Increased angle of cone of light within the glass of the prisms; (b) still further increased angle of cone outside the prisms, owing to the increased refraction of light on entering the prism; (c) increased field of view, owing to the shorter distance between the object-glass and the field-lens; (d) better correction of chromatic and spherical aberrations.

Third. To further increase the illumination, I cement together the two prisms $a$ $b$ and the field-lens $d$ of the eyepiece with Canada balsam or other suitable medium, thereby eliminating reflections between the prism-faces; but for greater rigidity I sometimes prefer to cement them to a thin plate $e$ of parallel glass, as shown in Fig. 1. In Figs. 2 and 4 the two prisms are shown cemented to the glass plate $e$, the field-lens $d$ and magnifying-lens $g$ of the eyepiece being mounted in a separate tube, as usual with ordinary prismatic telescopes. In Fig. 3 the two prisms are shown cemented face to face, the field-lens $d$ and the achromatic lenses $f$ and $g$ being detached therefrom.

Fourth. Since the increase of the aperture of the object-glass $c$ without increasing the length of the telescope involves diminution of the focal length of the object-glass and a corresponding diminution in the equivalent focal length of the eyepiece if the same magnification is to be maintained, I sometimes prefer to make the eyepiece of three achromatized elements—for example, the cemented field-lens $d$ above mentioned and two other achromatic lenses $f$ and $g$, Figs. 1 and 3—and in order still further to decrease the curvature and consequent aberrations of the eyepiece-lenses I prefer to make one or more of these achromatic lenses $f$ $g$ a combination containing an anomalous glass combining high refractive index with low dispersion, such as the densest baryta crown-glass, which enables an achromatic combination of relatively short focus and large aperture to be made with shallower curves and a flat field.

Fifth. As an alternative method of increasing the aperture or as an aid to the above I sometimes employ a concave (or biconcave) lens $h$, which is fixed between the object-glass and the first face of the prism $a$ or the glass plate $e$, or the concave lens may be cemented to a glass block $h'$, which is itself cemented to the plate $e$. This enables the aperture to be increased when ordinary glass is employed or to be still further increased when used in conjunction with prisms of dense glass. It has the further advantage of increasing the equivalent focal length of the object-glass, while retaining a comparatively short body, since the principle employed is the same as that of the telephoto-lens or Barlow telescope. It has the disadvantage, however, of giving a smaller field than can be obtained by the dense glass prisms alone, owing to this increase of the equivalent focal length.

The lens $h$ may in some cases be biconcave, the front concavity being for the before-mentioned purposes and the rear concavity being fashioned to correct undue aberration or curvature.

In Figs. 4 and 5 I have shown a pair of prismatic binoculars adapted to my improved system. The body consists of the two tubes $i$ $i$ and the two plates or bars $k$ $k$, all of which I prefer to form in one integral piece by casting the same in aluminium or other light metal or material. Upon the upper end of each tube I mount a prism-frame, which consists of a top-plate $l$, vertical strut or wall $m$, and lower plate $n$. The upper plate has an opening coincident with the axis of the eyepiece which projects through the opening, as shown in Fig. 4, and the lower plate is formed with an eccentric tubular extension which fits the tubular opening of the body-tubes $i$ and is coincident with the axis of the object-glass.

The prisms $a$ and $b$, with the intermediate glass plate $e$, are preferably mounted in the following manner: The glass plate $e$ is formed with an angular edge, as shown in Figs. 1 and 2, which takes into a groove formed in the rim $o$, which is tightened thereupon by the screw adjustment $o'$, Fig. 5. The rim $o$ is integral with or attached to a vertical plate $p$, which is fashioned to lie snugly against the inner wall of the vertical strut $m$, to which it is secured in any convenient way, such as by a conical nut $r$ and a screw-threaded pin or stud $p'$ attached to the plate $p$, as shown in Fig. 5. The top plate $l$ is provided with a cover or flange plate $l'$, which is detachable from the plate $l$ to allow of the inclosing case $s$ being removed.

The two prism frames or boxes are geared together within the top plate $k$ of the body in any well-known manner, so that the two prism-boxes are simultaneously operated to bring the eccentric eyepieces nearer together or to separate them in the well-known way.

With my improved system the focusing may be effected by extensible eyepieces or object-glasses, or by means of telescopic prism-boxes or by separating the latter more or less from the body, as found desirable.

I am aware that prismatic glasses have been produced in which the prisms have been combined or cemented together, also in which relatively large object-glasses have been employed; but in the latter case the actual aperture made use of has been reduced by stops or diaphragms to normal amounts. I am not aware, however, that any successful or other attempt has yet been made to considerably increase the aperture by scientific methods, especially by the important method of increasing the refractive index of the prisms (and) or by utilizing a concave lens, as above.

In the above description I have considered the application of these methods only to the ordinary pair of Porro prisms; but it is evident that the devices of increasing the refractive index or of employing a concave lens are applicable to increase the aperture of any glass in which erection is secured by total reflection by unsilvered surfaces at angles of forty-five degrees—as, for example, in the "roof-prisms" sometimes employed. The use of a divergent lens in combination with such prisms also enables the aperture to be increased.

I claim—

1. The combination with a pair of prisms formed of dense glass of a high refractive index and a low critical angle, of an intermediate thin plate of parallel glass to which the prisms are cemented, substantially as set forth.

2. The combination with a pair of prisms formed of dense glass as described, of an intermediate plate of parallel glass to which said prisms are cemented, and a cylindrical field-lens also cemented to said glass plate, substantially as and for the purpose described.

3. The combination with a pair of prisms formed of dense glass as described cemented together, of a cylindrical field-lens cemented to the face of one of said prisms, substantially as set forth.

4. The combination with a pair of prisms formed of dense glass for the purpose described, of a concave lens located in front of the first face of the prism system, for the purpose of still further increasing the aperture of the object-glass, substantially as set forth.

5. The combination with a pair of prisms arranged in contact one with the other, of a concave lens fixed in front of the first face of the prism system, substantially as set forth.

6. The combination with a pair of prisms formed of dense glass for the purpose aforesaid, and cemented to an intermediate plate of parallel glass to which the field-lens is also cemented, of an eye-piece composed of three achromatized elements, viz. the cemented field-lens, and two other achromatic lenses, substantially as set forth.

7. The combination with a pair of prisms formed of dense glass cemented to an intermediate plate of parallel glass to which the field-lens is also cemented, of an eye-piece composed of three achromatized elements, viz: the cemented field-lens and two other achromatic lenses, at least one of which is a combination containing an anomalous glass combining high refractive index with low dispersion, substantially as and for the purpose set forth.

8. The combination with a pair of prisms arranged close together and near to the eye-piece, of a biconcave lens fixed in front of the prism system, substantially as set forth.

9. The combination with a pair of prisms cemented to an intermediate plate of parallel glass, of a concave lens cemented to a glass block which is itself cemented to said glass plate, substantially as set forth.

10. In prismatic telescopes, binoculars, and the like, the method of mounting the prisms, consisting of a plate of parallel glass to which said prisms are cemented; an angular edge on said glass plate; a grooved rim adapted to surround and embrace the edge of said glass plate; means for tightening said rim upon the plate; and means for supporting said rim within the prism box or body, substantially as set forth.

11. The combination with a grooved rim adapted to surround and embrace the angular edge of a glass plate to which the prisms are cemented, of a screw adjustment for tightening said rim upon said glass plate; a plate integral with said rim; a vertical strut formed with top and bottom plates; a detachable top flange-plate; a removable case adapted to inclose the prism-body; and means for attaching said rim-plate to said vertical strut, substantially as set forth.

In testimony whereof I have hereunto set my hand in presence of two subscribing witnesses.

JAMES AITCHISON.

Witnesses:
W. J. NORWOOD,
JOSEPH LAKE.